(12) United States Patent
McDermid

(10) Patent No.: US 7,324,901 B2
(45) Date of Patent: *Jan. 29, 2008

(54) WATER MEASUREMENT AUTO-NETWORKS

(75) Inventor: John McDermid, Loveland, CO (US)

(73) Assignee: Colorado vNet, LLC, Loveland, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,260

(22) Filed: Jul. 15, 2005

(65) Prior Publication Data

US 2005/0261843 A1    Nov. 24, 2005

Related U.S. Application Data

(63) Continuation-in-part of application No. 10/777,525, filed on Feb. 11, 2004, now Pat. No. 6,925,398.

(60) Provisional application No. 60/485,591, filed on Jul. 7, 2003.

(51) Int. Cl.
*G01F 17/00* (2006.01)

(52) U.S. Cl. .............. 702/55; 455/52; 455/63; 455/64; 702/45; 702/50; 702/100; 702/187; 73/299; 73/301; 73/302; 73/290 R

(58) Field of Classification Search .......... 702/55
See application file for complete search history.

(56) References Cited

U.S. PATENT DOCUMENTS

| | | |
|---|---|---|
| 3,973,181 A | 8/1976 | Calvert |
| 4,277,845 A * | 7/1981 | Smith et al. .......... 455/505 |
| 4,347,478 A | 8/1982 | Heerens et al. |
| 4,347,740 A | 9/1982 | Townsend |
| 4,347,741 A | 9/1982 | Geiger |
| 4,373,389 A | 2/1983 | Decker |
| 4,418,565 A | 12/1983 | St. John |
| 4,418,569 A | 12/1983 | Kuhnel |
| 4,449,405 A | 5/1984 | Franz et al. |
| 4,479,116 A | 10/1984 | Kobayashi |
| 4,553,434 A | 11/1985 | Spaargaren |
| 4,818,492 A | 4/1989 | Shimizu |
| 4,977,786 A | 12/1990 | Davis |
| 5,001,596 A | 3/1991 | Hart |
| 5,017,909 A | 5/1991 | Goekler |
| 5,042,299 A | 8/1991 | Wells |

(Continued)

OTHER PUBLICATIONS

"Deep-ocean Assessment and Reporting of Tsunamis (DART)" [online], Mar. 27, 2003. ☐☐Retrieved form the Internet:<URL:https://web.archive.org/web/20030821074426/ http://www.nbdc.noaa.gov/DART/dart.shtml>.*

(Continued)

*Primary Examiner*—John Barlow
*Assistant Examiner*—Sujoy Kundu
(74) *Attorney, Agent, or Firm*—Trenner Law Firm, LLC

(57) ABSTRACT

Water measurement auto-networks and methods of operation are disclosed herein. An exemplary method may include determining a water level at a first water measurement station in an auto-network. The method may also include reducing power to at least a transmitter at the first water measurement station to conserve battery power during an inactive state. The method may further include increasing power to the transmitter only at predetermined times to communicate the water measurement data to a second water measurement station in the auto-network.

25 Claims, 8 Drawing Sheets

U.S. PATENT DOCUMENTS

| | | | |
|---|---|---|---|
| 5,052,223 | A | 10/1991 | Renault et al. |
| 5,083,470 | A | 1/1992 | Davis et al. |
| 5,097,703 | A | 3/1992 | Peter |
| 5,103,368 | A | 4/1992 | Hart |
| 5,145,323 | A | 9/1992 | Farr |
| 5,182,545 | A | 1/1993 | Goekler et al. |
| 5,238,369 | A | 8/1993 | Farr |
| 5,289,496 | A | 2/1994 | Nakagawa et al. |
| 5,343,084 | A | 8/1994 | Gens |
| 5,365,783 | A | 11/1994 | Zweifel |
| 5,400,651 | A | 3/1995 | Welch |
| 5,437,184 | A | 8/1995 | Shillady |
| 5,477,727 | A | 12/1995 | Koga |
| 5,722,290 | A | 3/1998 | Kronberg |
| 5,765,434 | A | 6/1998 | Harbaugh |
| 5,929,754 | A | 7/1999 | Park et al. |
| 6,016,697 | A | 1/2000 | McCulloch et al. |
| 6,020,825 | A | 2/2000 | Chansky et al. |
| 6,073,488 | A | 6/2000 | Byatt et al. |
| 6,117,643 | A * | 9/2000 | Simpson et al. ............ 435/7.1 |
| 6,164,132 | A | 12/2000 | Matulek |
| 6,178,818 | B1 | 1/2001 | Pbchinger |
| 6,295,869 | B1 | 10/2001 | Delatte |
| 6,297,733 | B1 | 10/2001 | Park |
| 6,310,440 | B1 | 10/2001 | Lansing et al. |
| 6,318,172 | B1 | 11/2001 | Byatt et al. |
| 6,405,590 | B1 | 6/2002 | Byatt et al. |
| 6,424,099 | B1 | 7/2002 | Kirkpatrick et al. |
| 6,490,919 | B2 | 12/2002 | Bilinski et al. |
| 6,490,920 | B1 | 12/2002 | Netzer |
| 6,539,797 | B2 | 4/2003 | Livingston et al. |
| 6,557,062 | B1 | 4/2003 | Shaler et al. |
| 6,563,328 | B1 | 5/2003 | Lenormand et al. |
| 6,925,398 | B2 * | 8/2005 | McDermid .................. 702/55 |
| 2001/0014847 | A1 * | 8/2001 | Keenan ..................... 701/117 |
| 2003/0093187 | A1 * | 5/2003 | Walker ......................... 701/1 |
| 2004/0082341 | A1 * | 4/2004 | Stanforth ................ 455/456.1 |
| 2004/0128091 | A1 * | 7/2004 | Delin et al. ................... 702/75 |

OTHER PUBLICATIONS

Johnson, Richard. J, "Electric Circuits." 1984, Hayden Book Company. pp. 290-295 and 299.*

"Introducing the Next Generation of Home Control Systems", 4 pgs, Advanced Control Technologies, Inc., Indianapolis IN. Available at www.act-solutions.com at least Jul. 2004.

Internet Presentation, "Zwave: the wireless language", 18 pgs. Available at www.act-solutions.com at least Jul. 2004.

Adams, Jon; "What you Should Know About the Zigbee Alliance" Sensors Expo Workshop, Sep. 24, 2003, Anaheim Convention Center, Anaheim, CA (original Authorship 2002); 139 pgs.

McDermid, John; "Structural Test: Applying the 1149.4 Architecture" Presented at the First Official IEEE 1149.4 Tutorial in Palo Alto, CA, May 3-4, 2002, 87 pages.

Cron, Adam; "Introduction to Boundry-Scan" Presented at the First Official IEEE 1149.4 Tutorial in Palo Alto, CA May 3-4, 2002, 64 pages.

Sunter, Stephen; "System Test Methods" Presented at the First Official IEEE 1149.4 Tutorial in Palo Alto, CA May 3-4, 2002, 54 pages.

Soma, Mani; "Architecture and Designs" Presented at the First Official IEEE 1149.4 Tutorial in Palo Alto, CA May 3-4, 2002, 75 pages.

US PTO File Wrapper for Parent U.S. Appl. No. 10/777,525 downlaoded from PAIR.

* cited by examiner

WATER MEASUREMENT AUTO-NETWORKS

PRIORITY APPLICATIONS

This application claims priority to co-owned U.S. Provisional Patent Application Ser. No. 60/485,591 for "WATER MEASUREMENT APPARATUS AND METHODS" of John McDermid, filed Jul. 7, 2003, and is a continuation-in-part (CIP) of co-owned U.S. patent application Ser. No. 10/777,525 for "WATER MEASUREMENT APPARATUS AND METHODS" of John McDermid, filed Feb. 11, 2004 now U.S. Pat. No. 6,925,398, each hereby incorporated herein for all that is disclosed.

TECHNICAL FIELD

This invention relates generally to water measurement, and more particularly to water measurement auto-networks.

BACKGROUND

Water management is increasingly important as water supplies continue to be a limited resource for municipal, agricultural, and recreational purposes. Quantifying water supplies remains at the core of water management. However, quantifying water supplies often requires somebody visit the reservoirs and/or feeder streams in the water supply system and physically measure the water level. Of course this can be a time consuming process, particularly when the water supplies are spread out over a large geographic area, or in rough terrain. The water level may vary substantially between visits, making effective water management more difficult.

Accordingly, a number of water measurement devices are available to automatically measure and record water levels. One such device includes a floatation device slidably mounted around a pipe in the water. Fluctuations in the water level cause the floatation device to move up and down along the length of the pipe. The floatation device is connected to a strip chart recorder which produces markings that correspond to the water level indicated by the floatation device. Over time, however, the pipe may become corroded and impair movement of the floatation device. In addition, floatation devices are susceptible to damage and may need to be replaced. A chart house is also needed to protect the strip chart recorder from the environment (e.g., rain, snow, and wind). Furthermore, somebody still needs to visit the chart house periodically to retrieve the strip chart recordings and replace the ink cartridges and strip chart paper.

Ultrasonic measurement devices are also available. However, stray reflections increase the signal noise and decrease the reliability of the reading. Ultrasonic measurement devices depend on the velocity of sound and therefore are also sensitive to air temperature, humidity, and altitude. Measurement devices are also available that use microwaves. However, the electrical power requirements of these devices limit their use to areas with suitable power sources. Other devices may produce inaccurate measurements if the effects of water temperature and conduction (salinity) are not addressed.

SUMMARY

An exemplary water measurement auto-network may comprise a water measurement device determining water measurement data for a first water measurement station. A transmitter may be operatively associated with the water measurement device at the first water measurement station. The transmitter operates in a sleep mode by default to conserve electrical power at the first water measurement station. The transmitter wakes up at predetermined times to communicate the water measurement data to a second water measurement station.

An exemplary auto-network of water measurement stations may include at least a first and second water measurement station. A water measurement device determines a water level for the first water measurement station. A transmitter at the first water measurement station may be communicatively coupled with a receiver at the second water measurement station on a part-time basis to deliver water measurement data to the second measurement station. A power-saving system at the first water measurement station operates the transmitter on the part-time basis by reducing power to the transmitter. The power-saving system increases power to the transmitter only at predetermined times to communicate the water measurement data to the second water measurement station.

An exemplary method comprises: determining a water level at a first water measurement station in an auto-network, reducing power to at least a transmitter at the first water measurement station to conserve battery power during an inactive state, and increasing power to the transmitter only at predetermined times to communicate the water measurement data to a second water measurement station in the auto-network.

DETAILED DESCRIPTION

Described herein are capacitive water measurement apparatus and methods to mitigate the effects of water salinity and the change in dielectric constant with temperature. Water measurement apparatus can be provided at low cost, is readily installed, and requires minimum maintenance. In addition, water measurement apparatus has low power requirements for operation. Water measurement apparatus may be implemented in an auto-networking environment to remotely transmit water measurement data (e.g., water level and corresponding time of the measurements) to a technician or other user. The water measurement apparatus may be implemented as a solid state device with no moving parts, eliminating mechanical failures, and is not readily corroded by water hardness. This and other implementations are described in more detail below with reference to the figures.

Implementations of the water measurement apparatus are accurate to at least ±0.25% accuracy for measurements of 0 to 4 ft (i.e., ±10.01 ft, ±0.12 in) and have a resolution of at least 0.01 ft (0.12 in). In addition, implementations of the water measurement apparatus are insensitive to air temperature, water temperature, water salinity, and residual deposits (reducing the need for regular cleaning).

Data can be gathered on-site by reading it directly from an optional LCD, or remotely by automatically transmitting data to a remote base station (e.g., accessible via the Internet). In addition, self-testing diagnostics may also be provided and may be implemented to remotely alert a user for maintenance or service, reducing the need for routine maintenance trips. The circuitry may also be field-programmable via RF commands.

Exemplary Auto-Network

Figure 1:
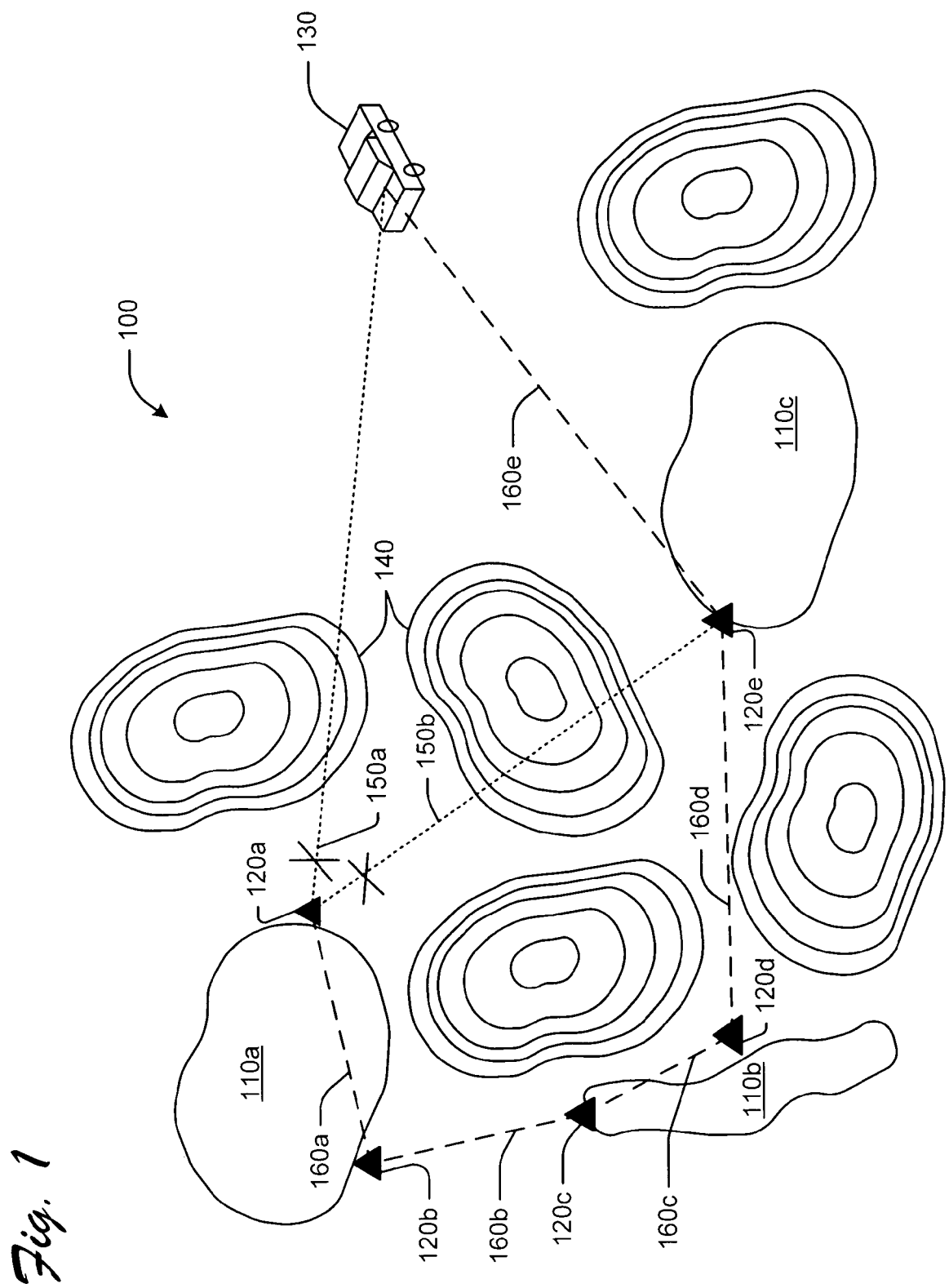
FIG. 1 is a high-level schematic diagram illustrating an exemplary implementation to auto-network a plurality of water measurement apparatus.

FIG. 1 is high-level schematic diagram illustrating an exemplary implementation to auto-network a plurality of water measurement apparatus. The auto-network may be implemented as a "call, talk, and hang-up" model. Data is forwarded in an optimal or near optimal path with some data being sent directly to an endpoint and other data passing through other measurement stations. Data can also be delivered to an accumulation point and modified (e.g., sending height, flow or volume data). The auto-network may also be auto-configured, so that if a gage is stationed within a predetermined distance of another station, it is detected and added to the auto-network.

A water storage system 100 may include one or more water supplies 110a, 110b, 110c (also referred to generally by reference 110), such as, e.g., reservoirs, rivers, ditches, and/or streams. A plurality of stations 120a, 120b, 120c, 120d, 120e (also referred to generally by reference 120) may implement the water measurement apparatus, discussed in more detail herein, to record water levels of the water supplies 1110.

One or more technicians (illustrated by vehicle 130) may be deployed to the stations 120 at various times to retrieve the water level data. In exemplary implementations, the recorded water levels are remotely transmitted as a data signal to the technician (e.g., to a laptop, PDA or other electronic device) without the technician having to visit each of the stations 120 individually. Such an implementation may be used, e.g., if the water storage system 100 is spread out over a large geographic area, or where the terrain is such that the technician cannot readily visit each of the stations 120 on a regular or semi-regular basis.

The stations may be auto-networked. Such an implementation may be used to transmit the recorded water level data to the technician if barriers 140, such as, e.g., mountains and/or buildings, exist in and around the water storage system 100 that block the data signal. A blocked data signal is illustrated in FIG. 1 with an "X" through signal path 150a, 150b.

Instead, the data signals are transmitted to other stations 120 in the auto-network using spread spectrum/frequency hopping to auto correct for RF congestion. For purposes of illustration, station 120a may transmit a data signal (e.g., including water level data for station 120a) to a technician at vehicle 130 via stations 120b-e over data path 160a-e. For example, station 120b may receive the data signal from station 120a and retransmit the data signal to station 120c, and so forth. Optionally, one or more of the stations 120b-e may include additional data in the data signal (e.g., water measurement data collected at these stations). Alternatively, communication can occur simultaneously between different stations.

Figure 2:
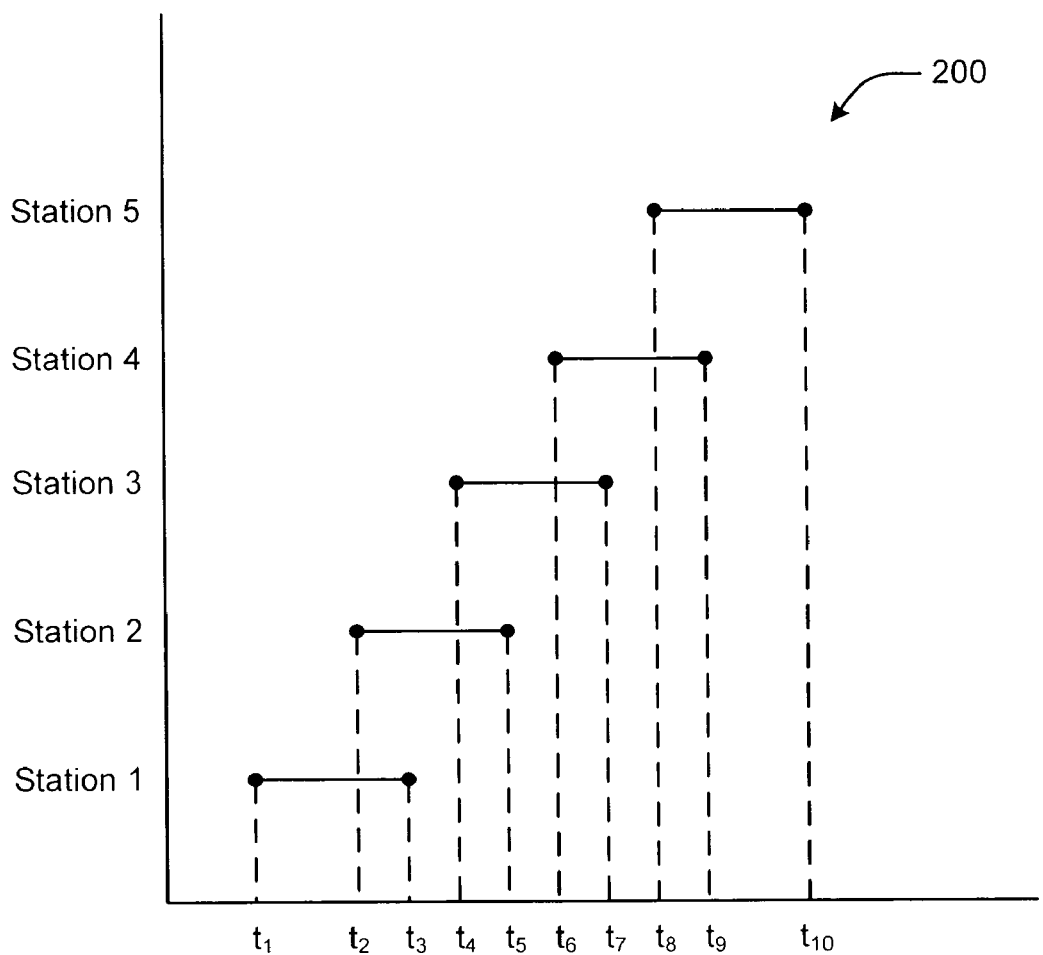
FIG. 2 is a graphical representation of a timing chart for operation of a water measurement apparatus in an exemplary auto-network.

FIG. 2 is a graphical representation of a timing chart 200 for operation of an exemplary auto-network. According to this implementation, the stations are in an active state to perform measurement and transmission operations, and are otherwise in an inactive state to reduce power consumption.

The timing chart 200 shows active states for stations 1-5 (e.g., stations 120a-e in FIG. 1). For purposes of illustration, Station 1 is in an active state from time $t_1$ to $t_3$, and is otherwise in an inactive state. During time $t_1$ to $t_3$, Station 1 makes a water level measurement and records it as a data signal. Transmission occurs during an overlap in the operation of Station 1 and Station 2. For example, in FIG. 2 transmission from Station 1 to Station 2 occurs on or after time $t_2$ when Station 2 becomes active, and prior to Station 1 becoming inactive at $t_3$.

In an exemplary implementation, the stations may be inactive or in a "sleep mode" every 1 to 2 seconds, and only need to be active during water level readings (e.g., <100 msec) and transmission operations (e.g., 15 msec), increasing the battery life and reducing maintenance. In other implementations, a plurality of water level measurements may be stored in memory and transmitted together. According to such an implementation, the active states of the stations do not have to overlap except during transmission from one station to another.

Exemplary Power Saving Operations

Water movement is a relatively slow process, e.g., when compared with electronic signaling. In exemplary water monitoring applications, it may be sufficient to sample on 10 to 15 minute intervals. In closed loop control applications, such as filling a ditch from a head gate, faster sampling times may be needed during the initial filling. However, even these sample intervals provide more time than is necessary to take the measurement and transmit the measurement data.

Receiving or transmitting data, e.g., in the unlicensed frequency band range of about 900 MHz to 2.4 GHz, consumes significant electrical power. Continuously "listening" for data from one station (e.g., 120a in FIG. 1) to relay to another station in the auto-network (e.g., 120b in FIG. 1), and transmitting the data to another station (e.g., station 120c in FIG. 1) may consume more power than the measurement itself. Accordingly, continuous operation requires the use of large batteries or continuous battery maintenance/replacement, both of which may be impractical for remote field applications.

An exemplary auto-network for water measurement data, such as the auto-network illustrated in FIG. 1, may implement a power-saving system. The power saving system may include a processing device (e.g., processor 440 in FIG. 4) and a timing element (e.g., clock 470 in FIG. 4). The microprocessor implements a schedule (e.g., based on the timing chart 200 in FIG. 2) for taking measurements and/or transmitting/receiving the measurements at predetermined times (e.g., 1 pm and 5 pm every other day) or at predetermined intervals (e.g., every 2 hours). By default, the microprocessor powers off (or reduces power) to some or all of the circuitry provided at the station, and the station is switched to a quiescent or "sleep" state, wherein the power requirements are reduced. The station "wakes up" by returning power to some or all of the circuitry at predetermined times, e.g., to take a measurement and/or transmit/receive measurement data.

It is noted that the station may "wake up" according to a predetermined schedule, or in response to an event (e.g., based on the water level reaching a threshold value, or changing by a threshold value). If the station "wakes up" in response to an event, the station typically logs the data for transmission according to the schedule so that other stations in the auto-network are "awake" to receive the transmission.

The power-saving system may include a precision time source. In an exemplary embodiment, 1 part in 1000 accuracy may be achieved over temperature changes by implementing a crystal time based device and a pre-programmed time interval (e.g., an instruction to wake up in a predetermined time). The crystal time based device enables long-term clock synchronization between the stations in the auto-network. That is, the clock at one station is not significantly ahead or behind the clocks provided at the other stations.

In an alternative embodiment, a single-chip, autonomous Global Positioning System (GPS) or other GPS devices may be implemented. GPS devices are commercially available with relatively low power consumption requirements for implementation at one or more stations in the auto-network. GPS devices provide a globally available time standard that is synchronized to within a millisecond for all stations in a "local neighborhood." The term "local neighborhood," as used herein, refers to two stations within the distance that light travels in a millisecond for all stations, and is approximately 150 miles.

A GPS device may be implemented at the stations to enable extended battery life, e.g., by synchronizing the time at each of the stations so that the transmitter/receiver is turned on according to a more precise schedule, with less activity overlap (e.g., illustrated by the timing chart 200 in FIG. 2). Implementing a GPS device also provides the time to the devices remotely, reducing or altogether eliminating the need for on-site clock adjustments at each of the stations.

In addition, GPS devices may be implemented at one or more stations to provide location data for the station (and hence, for the measurement data). The location data may also be transmitted, along with or separately from the water measurement data. For example, the location data may be transmitted as an additional 58 bytes, consuming only about 4 msec more operation time of the transmitter/receiver. Such information may be particularly desired for field workers who are responsible for the placement, maintenance, and monitoring of the stations.

In exemplary implementations, the power for a water height measurement is a small fraction of the power for transmitting the information to the next relay station. Accordingly, in closed loop control applications (i.e., an application having feedback), the reporting rate may correspond with the rate of change in water height. For example, the measurement data need only be transmitted if the water level changes by more than a predetermined amount within the 5 second transmission interval.

EXAMPLE 1

The following example illustrates implementation of a power-saving feature in an auto-network for water measurement data. In this example, water measurement data may include the measured water height and fully-qualified time (s) (e.g., in the YYYYMMDDHHMMSS format) indicating when the measurement was taken. The water height data may be represented by 8 bytes, and a corresponding fully-qualified time may be represented (with precision of about 1 second) by 48 bytes.

In this example, if the water measurement data is transmitted at a rate of 125 Khz, data transmission takes about 3.6 milliseconds (ms). If the network overhead and station wake-up time (i.e., time to power on the transmitter/receiver) take 1.4 ms, then the total transmit/receive time is about 5 ms. This time is much less than the sampling interval (e.g., 10 to 15 minutes).

Continuing with the example, a 100 milli-Watt (mW) transmitter may draw 875 mW from the battery when transmitting data, and may draw 175 mW from the battery when listening for incoming transmissions.

An exemplary, commercially available alkaline D cell battery may provide as much as 15 amp-hours of current. Assuming that the transmitter operates on 3 volts, two D cells in series provide about 45 watt-hours of energy. Accordingly, continuous transmission at the 100 mW level may exhaust the battery in as little as 50 hours. Even operating in a "listen-only" mode may exhaust the battery in as little as 250 hours. However, transmitting at 100 mW for 5 ms, and then reducing the transmitter/receiver to a quiescent power of about 150 µW for 5 seconds, reduces the average power requirements to about 1 mW, and the battery life may be extended to as much as 45,000 hours (e.g., about 5 years of service, approximately the shelf life of typical D cell batteries).

Before continuing, it is noted that various transmitters/receivers have different wake-up times and power-consumption requirements, which depend at least to some extent on design considerations. For example, some transmitters wake-up and are ready to operate network protocols in as little as 100 µsec. In addition, a 1 W transmitter may draw as much as 2.5 W from the battery when transmitting data, and 350 mW when receiving data.

EXAMPLE 2

In another example, one or more stations in the auto-network may be provided with global positioning system (GPS) capability. An exemplary GPS device may require monitoring applications where 15 minutes is an acceptable interval, a cold start (recent or "hot starts" can be as short as 1 second) of the GPS chip requires 40 seconds drawing 62 mW of power. Assuming a conservative hot start of 4 seconds, the average 100 mW transmit power and GPS power may be calculated according to the following formula:

$$GPSPwr = \frac{(TP*t + GP(4 \text{ sec}))}{i*(60 \text{ sec/min})}$$

where:
GPSPwr=GPS Power (W);
TP=Transmit Power (W);
GP=GPS Average Power (W);
i=Transmit Interval (minutes); and
t=Transmit Time (seconds).

And in this example, is about 20 micro watts (µW), as calculated below:

$$\frac{(0.875*0.005) + (0.062*4)}{15*(60)} = 2.8042 \times 10^{-4}$$

A typical AA battery provides a capacity of about 2.85 Amp hours, and the voltage of two AA batteries is about 3 volts. Therefore, two AA batteries provide about 8.55 (e.g., 2.85×3) watt-hours of power. If the quiescent power dissipation is 150 µW, and 20 µW are added for transmitting and GPS, then the expected battery life is about 3.5 years (which is the approximate shelf life of a typical AA battery).

It is noted that the above examples for battery life at the stations in an auto-network are provided for purposes of illustration, and are not intended to be limiting. Othel embodiments are also contemplated. The specific power consumption and battery life will depend at least to some extent on design considerations, such as the equipment used and various environmental factors, to name only a few examples.

Exemplary Water Measurement Apparatus

Figure 3A:
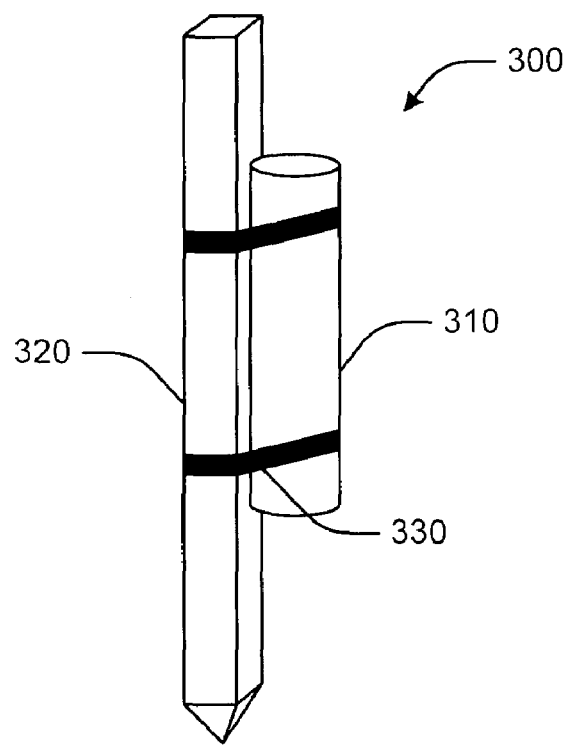
FIG. 3a is a perspective view of an exemplary water measurement apparatus as it may be installed on a post.
Figure 3B:
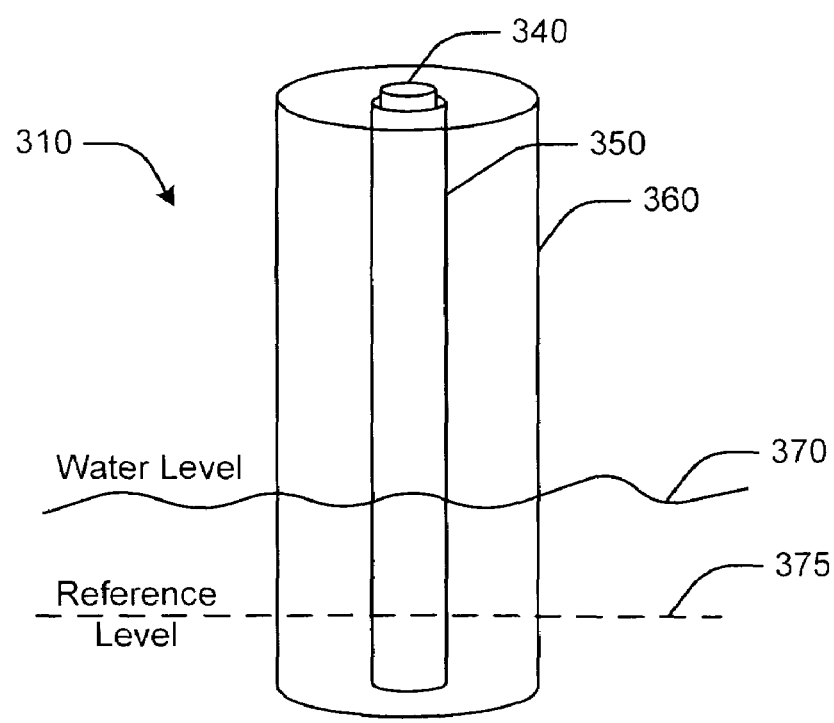
FIG. 3b is a diagrammatic illustration of an exemplary water measurement apparatus.

FIG. 3a is a perspective view of an exemplary water measurement apparatus 300. Water measurement apparatus includes a measurement gage 310 that may be readily installed by attaching it to a post 320 (e.g., a T-post), e.g., using hose clamps or cable clamps 330 or other suitable fasteners. The post 320 may be driven into the ground so that the measurement gage 310 is in the water (e.g., as illustrated in FIG. 3b). Measurement gage 310 can be readily positioned up or down along the post 320 and rotated (e.g., to aim a directional antenna for an RF link).

Water measurement apparatus 300 may be located upstream from a weir and used to determine volumetric water flow (e.g., measured in cubic feet per second, CFS). Water law often refers to water in terms of acre feet (AF) available to users. A water manager may be obligated to deliver water (measured in CFS) for a defined period of time (often 24 hours).

Having said this, it is also noted that water measurement apparatus 300 does not need to be implemented with a weir. For example, the water measurement apparatus 300 may be implemented as a staff gage. Reservoir capacities may be predetermined and calibrated against the staff gage. The water height measured by the staff gage can be used to determine the stored water capacity (e.g., in AF) in the reservoir. With this data available at the beginning of the water season, the shareholders can determine in advance how much water they should expect for the season.

Measurement gage 310 is shown according to an exemplary implementation in more detail in FIG. 3b. Measurement gage 310 may be configured as co-axial cylinders, although other geometries are also possible. In one such implementation, measurement gage 310 includes an inner conductor 340 surrounded by insulating sheath 350, and an outer conductor 360. An optional opening (not shown) may be formed in the measurement gage 310 (e.g., in the top surface of the outer conductor) where damping is a concern. The size of the opening may be increased for a faster response to changes in water height.

As water fills the region between the insulating sheath 350 and the outer conductor 360, the capacitance between the inner conductor 340 and outer conductor 360 increases because water has a significantly higher dielectric constant than air. The increase in capacitance is proportional to the water height 370 in the measurement gage 310. The reference (or zero) level 375 of the water produces a reference level of capacitance. When this capacitance is determined and subtracted from the measured capacitance (and the capacitance per unit of height is known), the water height can be computed.

In an exemplary implementation, the insulating sheath 350 is chosen for its lack of conduction current (i.e., it is a good insulator). Suitable materials for the insulation sheath may include, but are not limited to Teflon, PVC, or other insulating and low water-absorption materials (e.g., plastics). The resistive component of the insulating sheath (i.e., part of the sheath material) is determined by its displacement current (dielectric loss). Air is also a good insulator and for most practical purposes has no displacement current.

When more than one dielectric material is stacked between conductors, the capacitance is the same as the capacitance of each material connected in series. The capacitance of the insulating sheath 350 is in series with the capacitance of the water. When two materials are placed side-by-side between conductors, the capacitance is the same as the capacitance of each material connected in parallel. In the embodiment of the measurement gage 310 shown in FIG. 3b, the capacitance of the section filled with water is in parallel with the capacitance of the section filled with air (e.g., above the water level).

Figure 3C:
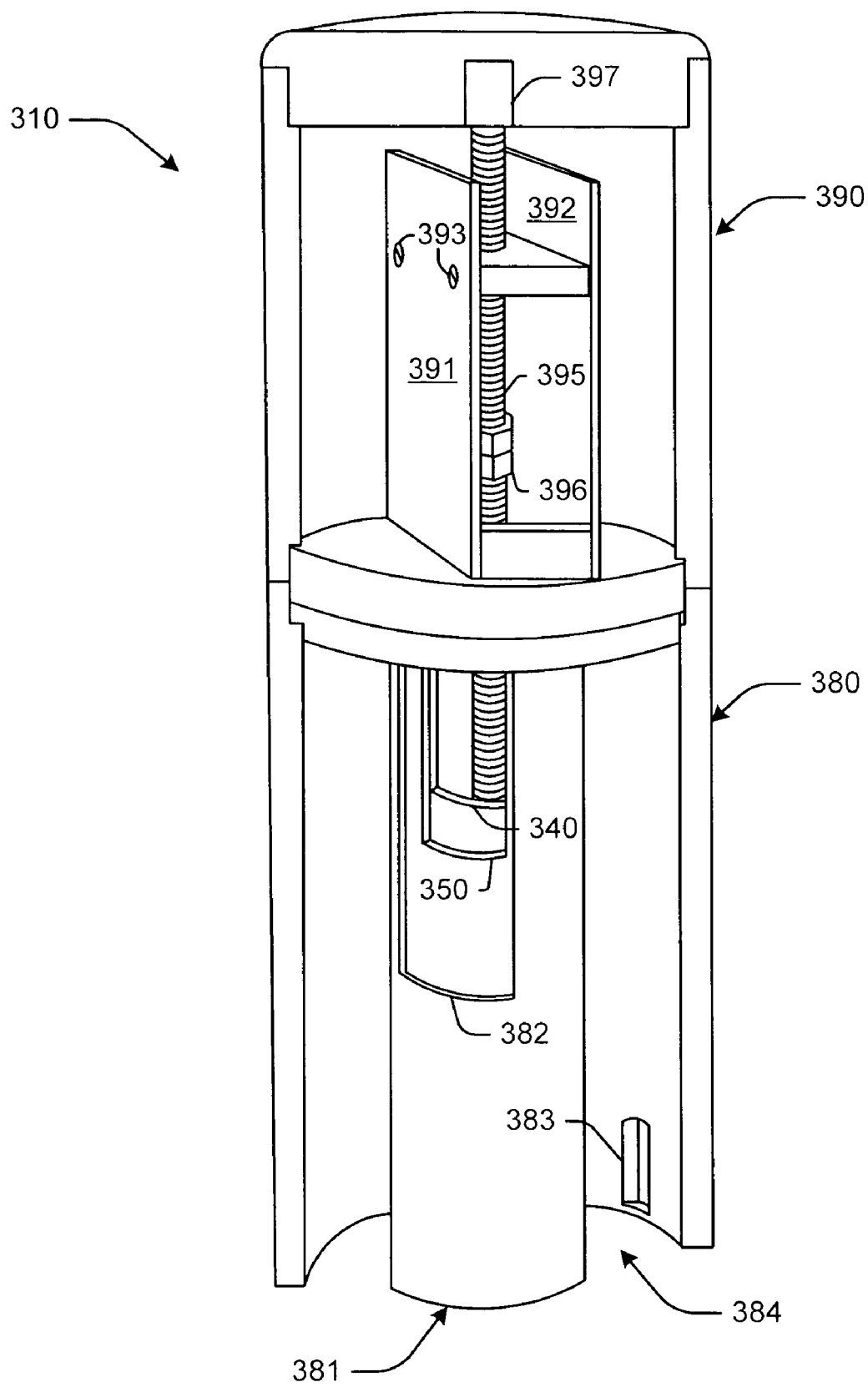
FIG. 3c is a cut-away perspective view of an exemplary water measurement apparatus.

FIG. 3c is a cutaway perspective view of an exemplary water height measurement apparatus showing the measurement gage 310 in more detail. The measurement gage may include a base portion 380 and a top portion 390. Base portion 380 may house the measurement capacitor 381. Measurement capacitor 381 may include an outer gage electrode 382 surrounding insulating sheath 350 and inner conductor 340. One or more openings 383 are formed in the outer conductor 360 to allow water to enter an integral stilling well 384 formed as part of the base portion 380 between the measurement capacitor 381 and the outer conductor 360.

Top portion 390 may house the circuitry, such as, e.g., a transceiver and battery board 391 and a measurement board 392. The circuit boards 391, 392 may be mounted in the top portion 390, e.g., by fasteners 393. Electrical connections (not shown) may also be provided between the circuit boards 391, 392 and the measurement capacitor 381 in base portion 380. The top portion 390 may be mounted to the bottom portion 380, e.g., by a threaded rod 395 using nuts 396 and compression fitting 397.

Figure 4:
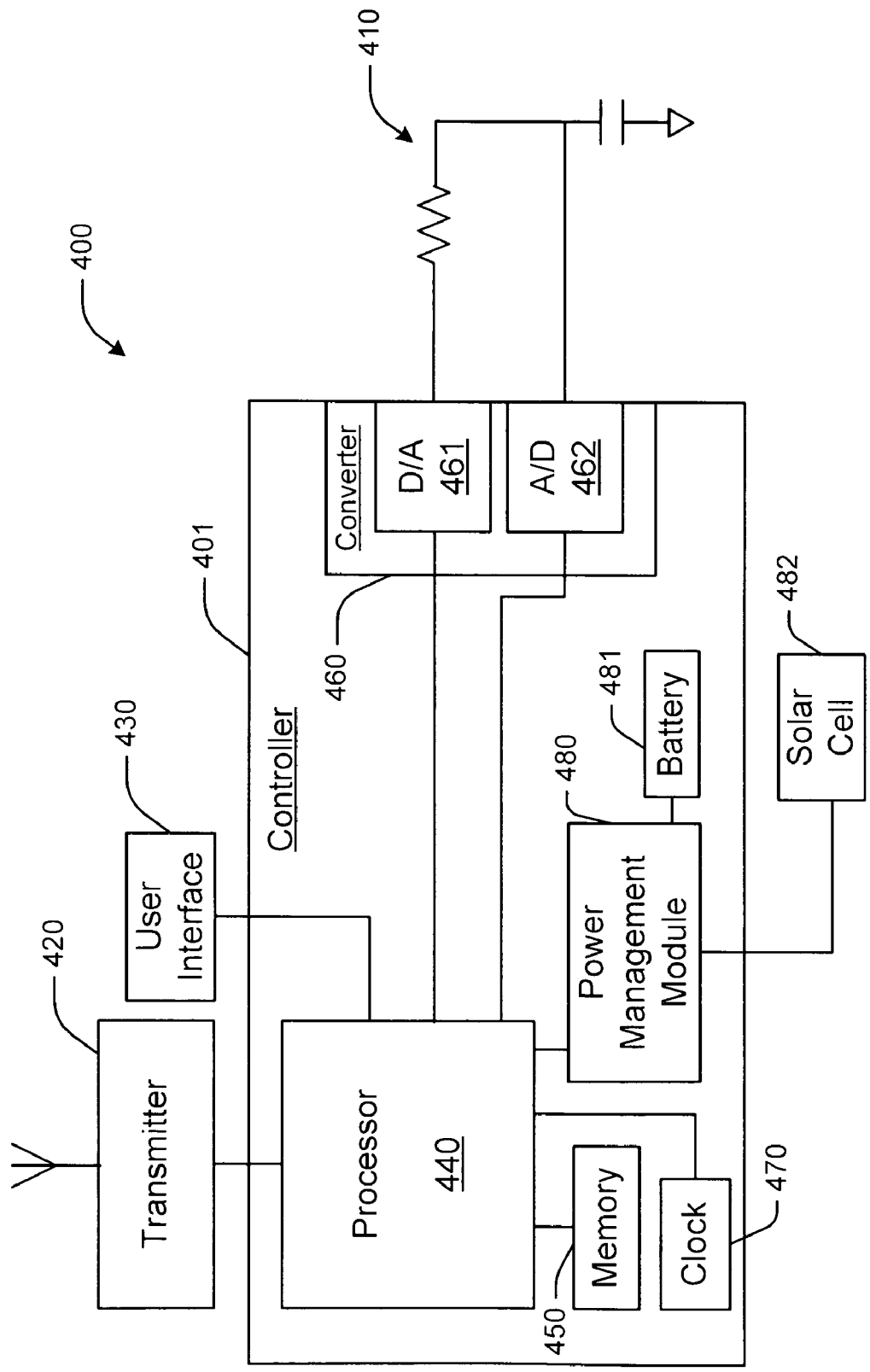
FIG. 4 is a functional block diagram illustrating an exemplary implementation of control circuitry.

FIG. 4 is a functional block diagram illustrating exemplary control circuitry 400 that may be used to implement a water measurement apparatus. Control circuitry 400 may be provided, e.g., on a computer board 401 mounted in a protective housing to the water measurement apparatus (e.g., as illustrated in an exemplary implementation in FIG. 3c).

Control circuitry 400 is operatively associated with a gage or measurement circuit 410, discussed in more detail below. Control circuitry 400 may also be operatively associated with an optional transmitter 420 (e.g., RF transmitter) for remote data and program management (e.g., in the auto-network of FIG. 1). An optional user interface 430 (e.g., an interactive display implemented with an LCD) may also be provided.

Control circuitry 400 includes one or more processor 440 (or processing units), and computer-readable storage or memory 450 (e.g., Flash memory). Memory 450 may be used, for example, to store water level data (e.g., water height measurements). Processor is operatively associated with the measurement gauge 410, e.g., via converter 460 including a digital to analog (D/A) converter 461 and analog to digital (A/D) converter 462.

Control circuitry 400 also includes computer-readable program code for implementing operations on the processor 440. In an exemplary implementation, program code is provided for managing the application of the signal (e.g., sin wave) from the D/A converter 461, the measurement with the A/D converter 462, and storing water level data.

Program code is also provided for operations on the water level data using a Discrete Fourier Transform (DFT) algorithm, computing real and Imaginary values of the gage measurement with respect to the phase of the input, and determining the capacitance based on the voltage measurement. These operations for determining the water height based at least in part on the measured voltage are described in more detail below. Optional program code may also be provided for determining the flow rate (e.g., over a weir) and/or the total volume of water (e.g., in a reservoir) based on one or more water height measurements.

In one embodiment, the program code may be implemented as scripts. Embodiments for controlling a device using scripts are described in co-pending, co-owned U.S. patent application entitled "DISTRIBUTED CONTROL SYSTEMS AND METHODS FOR BUILDING AUTOMATION" of Hesse, et al., filed on Apr. 24, 2003 (Ser. No. 10/422,525), which is hereby incorporated herein by reference for all that it discloses. The scripts may be defined based on various parameters, such as the needs and desires of those responsible for monitoring the water. The scripts can also be reconfigured based on the changing needs and/or desires of those responsible for monitoring the water.

Control circuitry 400 may also include a clock 470 (e.g., a battery-backed, real-time clock). Clock 470 may be used to record the time of a water height measurement. Clock 470 may also be used to initiate measurements and/or implement a timing schedule, such as the timing diagram illustrated in FIG. 2 for auto-networking.

Control circuitry 400 may also include a power management module 480 operatively associated with one or more power sources, such as, e.g., battery 481 and solar cell 482.

Exemplary Operations

Briefly, the complex measurement method involves solving simultaneous equations for capacitance and resistance using the real and imaginary voltages. The real and imaginary voltage measurements are passed through a discrete Fourier Transform (DFT). The sine wave is smoothed by gage capacitance. The measurement shows real and imaginary values that are about equal. The result is independent of salinity and other factors affecting conduction current.

Temperature dependence may be reduced using a Teflon sleeve. The sensitivity of capacitance ($C_1$) may be determined as follows, where the thickness of the Teflon sleeve is chosen to determine S.

$$C_l = \frac{C_{water}C_{sheath}}{C_{water} + C_{sheath}} \text{ and}$$

$$S = \frac{C_{sheath}}{C_{water} + C_{sheath}}$$

Where $C_{sheath}$ for Teflon is 43.9 pF/in and $C_{water}$ is 322.2 pF/in. Accordingly, S is 0.1199. The remaining variation may be compensated with an optional temperature sensor inside the inner tube.

The effects of residual deposits may also be reduced. Under the water, residual deposits have a much smaller dielectric constant than that of water and the effects on accuracy are negligible. Above water, the volume of water contributes to capacitance. Therefore, surface wetting effects on accuracy are negligible.

The following equations illustrate exemplary operations to implement a water measurement apparatus (such as the water measurement apparatus 300 shown in FIGS. 3a and 3b). In one embodiment, the operations may be implemented by control circuitry, such as the control circuitry 400 shown in FIG. 4.

Figure 5:
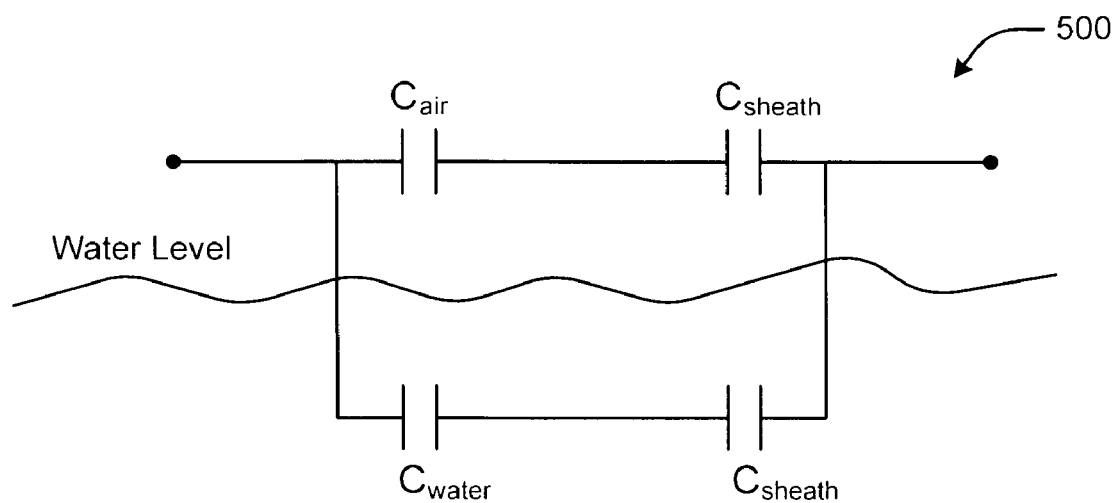
FIGS. 5-8 are circuit diagrams that may be used to implement an exemplary water measurement apparatus.

A measurement circuit (e.g., gage 410 in FIG. 4) may be modeled according to one implementation by circuit 500 shown in FIG. 5 The total gage capacitance for circuit 500 is defined by equation (1):

$$C_{gage} = \frac{C_{water}C_{sheath}}{C_{water} + C_{sheath}} + \frac{C_{air}C_{sheath}}{C_{air} + C_{sheath}} \quad \text{(EQ 1)}$$

When $C_{water}$ is much larger than $C_{sheath}$ the series capacitance is dominated by $C_{sheath}$. Also note that the capacitance of the empty section is dominated by $C_{air}$.

Figure 6:
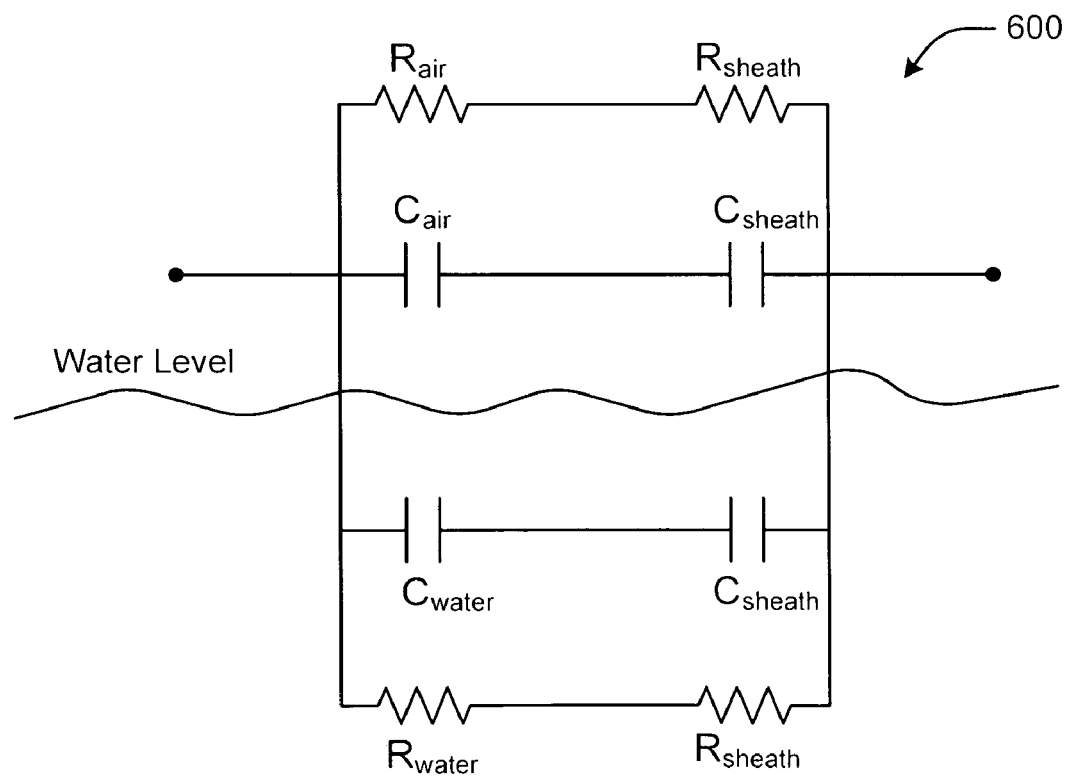

The gage capacitance may be corrected for temperature and salinity, as modeled in FIG. 6 by circuit 600. With regard to temperature, the dielectric constant of water is about 78.5 at room temperature and varies from about 85 near freezing to about 56 near the boiling point. The measured capacitance depends on the temperature of the water. However, if the geometries of the insulating sheath and the space that fills with water are chosen so that $C_{water}$ is much greater than $C_{sheath}$ and the empty space Such that $C_{air}$ is much less than $C_{sheath}$, the measured value of capacitance depends primarily upon the characteristics Of $C_{sheath}$. It should be noted that the temperature need not be measured to compensate for its effect when a stable material (e.g., Teflon) is used for the sheath.

The conductivity of the water also varies with salinity. The measurement method is preferably insensitive to changes in $R_{water}$. Measurement techniques may be employed to separate resistance and capacitance in parallel, such as, e.g., those known in analog in-circuit testing.

The gage capacitance may also be corrected for conductivity and salinity of the water. The water also has a loss component in parallel (whether by conduction current, displacement current, or both) with the dielectric.

Figure 7:
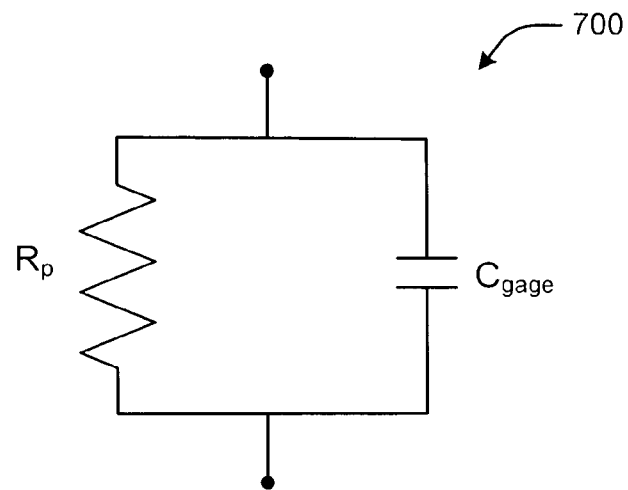
Figure 8:
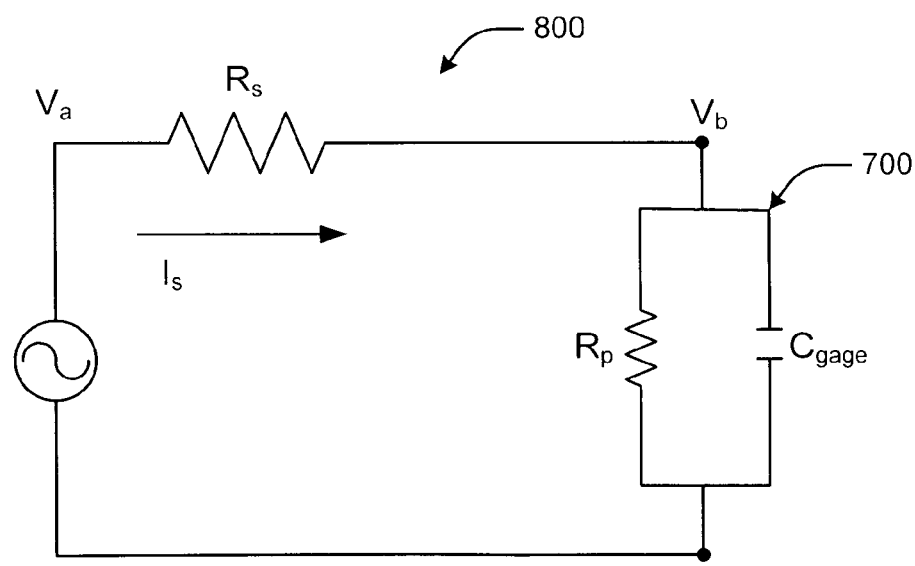

The gage may be modeled using the equivalent capacitance and dielectric loss, as shown by circuit 700 in FIG. 7. The circuit 700 is connected into a circuit 800 shown in FIG. 8 to measure voltage. The voltage, $V_b$, is (by direct circuit analysis):

$$V_b = \frac{R_p + \frac{1}{j\omega C_{gage}}}{R_p + \frac{1}{j\omega C_{gage}}}(I_s) \quad \text{(EQ 2)}$$

Where $$I_s = \frac{V_a - V_b}{R_s}$$

Expanding equation 2, the real component and the imaginary component of this equation form another system of equations which can be directly solved for the gage capacitance and parallel resistance. The solution for gage capacitance is:

$$C_{gage} = \frac{-\text{Im}\{V_b\}V_a}{\omega R_s((\text{Re}\{V_b\})^2 + (\text{Im}\{V_b\})^2)} \quad \text{(EQ 3)}$$

The solution for parallel resistance is:

$$R_p = \frac{-((\text{Re}\{V_b\})^2 + (\text{Im}\{V_b\})^2)R_s}{(\text{Re}\{V_b\})^2 - \text{Re}\{V_b\}V_a + (\text{Im}\{V_b\})^2} \quad (\text{EQ 4})$$

The results are readily checked in Matlab as follows:

```
%Script to check derivation
%Define component values
Rs=10000;
Rp=1000;
Cgage=22-e-12;
Va=5;
F=10000;
%Compute the impedance of R in parallel with Cgage
W=2*pi*f;
Xcp=1/(j*w*Cgage);
Zp=Rp*Xcp/(Rp+Xcp);
%Compute the voltage Vb
Vb=(Zp/(Rs+Zp))*Va
%Find the real and imag values of Vb
v1=real(Vb);
v2=imag(Vb);
%Compute Cgage from measured voltages
Cgage_meas=-Va*v2/(w*Rs*(v1^2+v2^2)
%Compute Rp from measured voltages
Rp_meas=-(v1^2+v2^2)*Rs/(v1^2-Va*v1+v2^2)
```

For a gage capacitance of 220 pF, a source resistance of 10K, and a parallel resistance of 10K, and a frequency of 10 KHz checks as:

```
Vb = 0.4545 − 0.0057i
Cgage_meas = 2.2000e−010
Rp_meas = 1.0000e+003
```

Changing the frequency to 1 KHz results in a more reasonable value of $V_b$, but produces no other changes. Similar results were produced by varying the other parameters.

The discrete Fourier transform of a signal (DFT) is defined as:

$$V(k\Delta\omega) = \frac{j\sqrt{2}}{N}\sum_{n=0}^{N-1} V(n)e^{-j\frac{2\pi nk}{N}} \quad (\text{EQ 5})$$

Where N is the number of samples of the waveform and delta ω is the change in radian frequency. If the time between samples is delta t, the change in radian frequency is defined as:

$$\Delta\omega = \frac{1}{N\Delta t} \quad (\text{EQ 6})$$

The actual radian frequency is:

$$\omega = k\Delta\omega = \frac{k}{N\Delta t} \quad (\text{EQ 7})$$

The integer k is chosen so that omega (ω) is the desired frequency.

Exemplary Calculation

The parameters for the check solution are defined as:

```
%Define the parameters
N=100;
deltaT=1.12e−4
amplitude=1;
phaseAngle=45;
approx_freq=1000;
```

Here N is the number of samples, deltaT is the time between samples, amplitude is the RMS value of the voltage, phaseAngle is the phase angle of the signal with respect to a sine wave, and approx_frequency is the target frequency. The actual frequency is the nearest integer frequency (because of deltaT) to the target frequency.

The vector of times and the actual frequency is determined by:

```
%Computer the time vector
T=0;deltaT;(Nsamples−1)*deltaT;
K=round(F/deltaF);
Freq=k*deltaF;
```

The signal (as a function of time) is computed by:

```
%Compute the time varying voltage vector
v=sqrt(2)*amplitude*sin(2*pi*Freq*t+pi*phaseAngle/180);
```

The discrete fourier transform (DFT) of the signal is computed by:

```
%Computes the discrete fourier transform at one frequency
n=0;N−1;
Vac=sqrt(2)*j*v*exp(j*2*pi*k*n/N)N;
```

Note that in Matlab, v is a row vector and exp (j*2*pi*k*n/N)' is a column vector. When these two quantities are multiplied together, the result is the sum of the product of the elements.

The real and imaginary values are equal and positive (as we expect them to be at a 45 degree angle). The magnitude of the voltage (sqrt(Vreal^2+Vimag^2)) is equal to 1 which was the value set.

Figure 9:
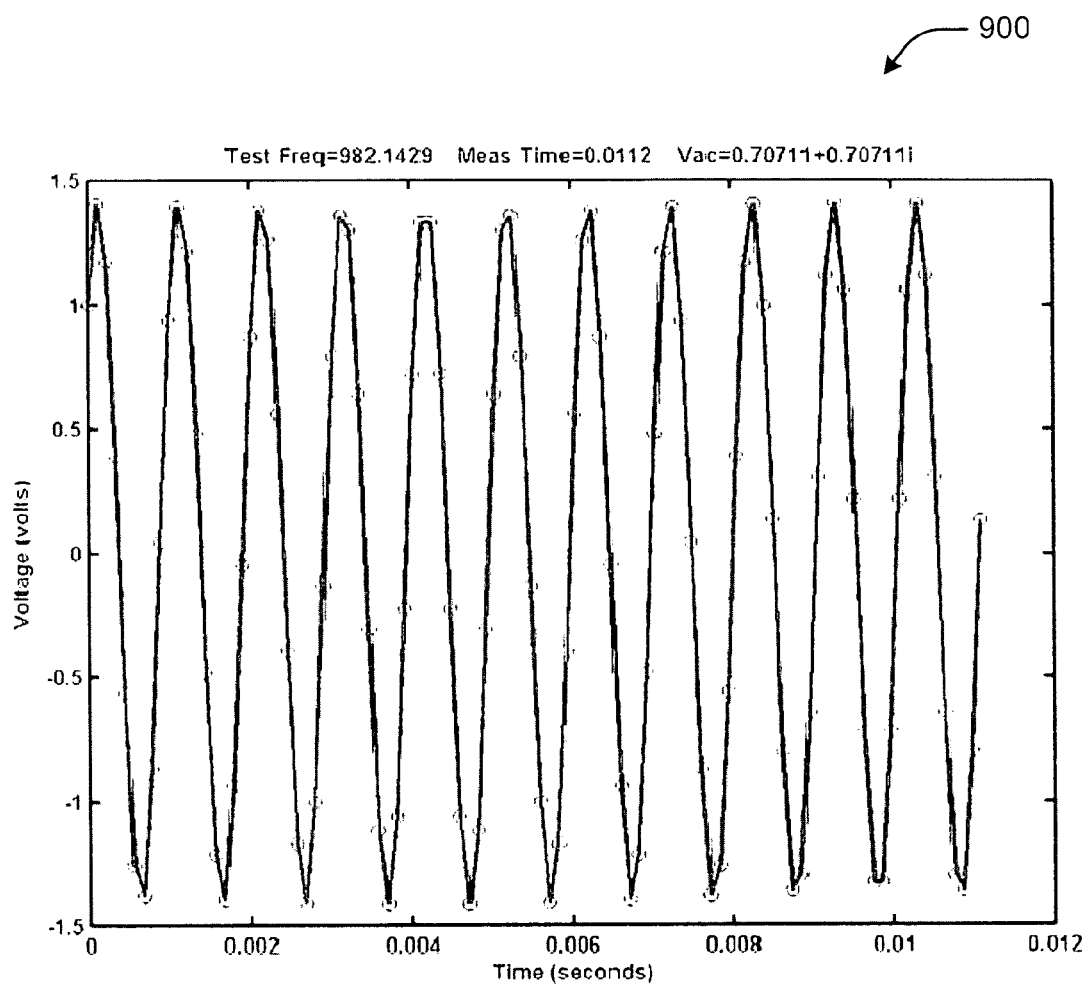
FIG. 9 is a plot of a waveform showing sample points during operation of an exemplary water measurement apparatus.

FIG. 9 is a waveform showing sample points during operation of an exemplary water measurement apparatus. Note that there are multiple circles of the input waveform sampled. The data for the D/A contains all the points shown as circules.

For computational convenience, the real and imaginary values can be separately computed by noting that:

$$V(k\Delta\omega) = \frac{j\sqrt{2}}{N}\sum_{n=0}^{N-1}V(n)e^{\frac{-j2\pi nk}{N}} \quad \text{(EQ 8)}$$

$$= \frac{j\sqrt{2}}{N}\sum_{n=0}^{N-1}V(n)\left(\cos\left(\frac{2\pi nk}{N}\right) + j\sin\left(\frac{2\pi nk}{N}\right)\right)$$

$$= \frac{\sqrt{2}}{N}\sum_{n=0}^{N-1}V(n)\left(j\cos\left(\frac{2\pi nk}{N}\right) - \sin\left(\frac{2\pi nk}{N}\right)\right)$$

OR $$V(k\Delta\omega) = \frac{-\sqrt{2}}{N}\sum_{n=0}^{N-1}V(n)\sin\left(\frac{2\pi nk}{N}\right) + j\frac{\sqrt{2}}{N}\sum_{n=0}^{N-1}V(n)\cos\left(\frac{2\pi nk}{N}\right) \quad \text{(EQ 9)}$$

Exemplary Design Parameters

The empty value of capacitance is:

---

Design Inputs:

Dielectric constants:
$\epsilon_0 := 8.854 * 10^{-12}$ farad/m
$\epsilon_{water} := 78.54$
$\epsilon_{pvc} := 4.5$
$\epsilon_{air} := 1$
Outside diameter of the inner conductor:
$r_{ic} := \frac{0.875 \text{ in}}{2}$ Inside diameter of the outer conductor:
$r_{oc} := \frac{1.500 \text{ in}}{2}$ Inside diameter of the PVC pipe:
$r_{ipvc} := \frac{0.930 \text{ in}}{2}$ Outside diameter of the PVC pipe:
$r_{opvc} := \frac{1.050 \text{ in}}{2}$ Length of the gage:
$L := 22$ in

---

The capacitance for a gage height H is:

---

Height of water in gage: $H = 0.0001$ inch
$C_{gage} = 6.992 \times 10^{-11}$ F

---

The full scale value of capacitance is:

---

Design Inputs:

Dielectric constants:
$\epsilon_0 := 8.854 * 10^{-12}$ farad/m
$\epsilon_{water} := 78.54$
$\epsilon_{pvc} := 4.5$
$\epsilon_{air} := 1$
Outside diameter of the inner conductor:
$r_{ic} := \frac{0.875 \text{ in}}{2}$ Inside diameter of the outer conductor:

---

-continued

---

Design Inputs:

$r_{oc} := \frac{1.500 \text{ in}}{2}$

Inside diameter of the PVC pipe:
$r_{ipvc} := \frac{0.930 \text{ in}}{2}$

Outside diameter of the PVC pipe:
$r_{opvc} := \frac{1.050 \text{ in}}{2}$

Length of the gage:
$L := 22$ in

---

The capacitance for a gage height H is:

---

Height of water in gage: $H = 18$ inches
$C_{gage} = 2.878 \times 10^{-10}$ F

---

It is readily apparent that the water measurement apparatus and methods of the present invention represent important developments in the field of water monitoring. Having herein set forth exemplary implementations, it is anticipated that suitable modifications can be made thereto which will nonetheless remain within the scope of the invention.

The invention claimed is:

1. A water measurement auto-network comprising:
   a water measurement device determining water measurement data for a first water measurement station;
   a transmitter operatively associated with the water measurement device at the first water measurement station, the transmitter operating in a sleep mode by default, wherein the transmitter is inactive other than during water level readings to conserve electrical power at the first water measurement station, and the transmitter waking up at predetermined times to take water level readings and communicate the water measurement data to a second water measurement station, wherein the transmitter wakes up based on an event.

2. The water measurement auto-network of claim 1 further comprising at least one precision time source for synchronizing time at the first water measurement station with time at the second water measurement station.

3. The water measurement auto-network of claim 2 wherein the precision time source extends battery life at the first and second water measurement stations by reducing activity overlap between the first and second water measurement stations.

4. The water measurement auto-network of claim 2 wherein the precision time source is a crystal time-based device.

5. The water measurement auto-network of claim 2 wherein the precision time source is a single chip autonomous GPS device.

6. The water measurement auto-network of claim 1 wherein the transmitter wakes up based on the water level at the first water measurement station.

7. The water measurement auto-network of claim 1 wherein the transmitter wakes up only if the water level at the first water measurement station changes by a predetermined value.

8. The auto-network of water measurement stations of claim 1 wherein the water measurement data includes the water level and a corresponding sample time.

9. The auto-network of water measurement stations of claim 1 wherein the first and second measurement stations toggle between an active state and an inactive state, the active state of the first measurement station overlapping in time with the active state of the second measurement station.

10. An auto-network of water measurement stations comprising:
at least a first and second water measurement station;
a water measurement device determining a water level for the first water measurement station, wherein the water measurement device determines the water level from a capacitance value based on a measured voltage;
a transmitter at the first water measurement station communicatively coupled with a receiver at the second water measurement station on a part-time basis to deliver water measurement data to the second measurement station; and
a power-saving system at the first water measurement station, the power-saving system operating the transmitter on the part-time basis by inactivating power to the transmitter, and the power-saving system reactivating power to the transmitter only at predetermined times in response to an event to communicate the water measurement data to the second water measurement station.

11. The auto-network of water measurement stations of claim 10 wherein the power-saving system further reduces power to the water measurement device, and the power-saving system increases power to the water measurement device only at predetermined times to collect water measurement data.

12. The auto-network of water measurement stations of claim 10 further comprising a power-saving system at the second water measurement station for operating the receiver on the part-time basis.

13. The auto-network of water measurement stations of claim 10 wherein the power-saving system at the second water measurement station reduces power to the receiver by default.

14. The auto-network of water measurement stations of claim 10 wherein the power-saving system at the second water measurement station increases power to the receiver only at predetermined times to receive the water measurement data from the first water measurement station.

15. The auto-network of water measurement stations of claim 10 further comprising a GPS device for synchronizing time at the first and second water measurement stations.

16. A method comprising:
determining a water level at a first water measurement station in an auto-network;
inactivating power to at least a transmitter at the first water measurement station to conserve battery power during an inactive state;
reactivating power to the transmitter only at predetermined times in response to an event to wake up the transmitter and to communicate the water measurement data to a second water measurement station in the auto-network;
storing the water measurement data at the second water measurement station; and
reducing power to a water measurement device at the first water measurement station during the inactive state; and
increasing power to the water measurement device only at predetermined times to collect water measurement data.

17. The method of claim 16 further comprising synchronizing a clock at the first water measurement station with a clock at the second water measurement station to reduce overlap in operation of the first and second water measurement stations.

18. The method of claim 16 further comprising:
reducing power to a receiver at the second water measurement station; and
increasing power to the receiver only at predetermined times to receive the water measurement data from the first water measurement station.

19. The method of claim 16 further comprising relaying the water measurement data to at least a third water measurement station in the auto-network.

20. The method of claim 16 further comprising waking the water measurement stations on a predetermined schedule.

21. A method comprising:
determining a water level at a first water measurement station in an auto-network;
inactivating power to at least a transmitter at the first water measurement station to conserve battery power during an inactive state;
activating power to the transmitter only at predetermined times in response to an event to communicate the water measurement data to a second water measurement station in the auto-network;
storing the water measurement data at the second water measurement station;
reducing power to a receiver at the second water measurement station after the event; and
increasing power to the receiver only at predetermined times to receive the water measurement data from the first water measurement station.

22. The method of claim 21 further comprising:
reducing power to a water measurement device at the first water measurement station during the inactive state; and
increasing power to the water measurement device only at predetermined times to collect water measurement data.

23. The method of claim 21 further comprising synchronizing a clock at the first water measurement station with a clock at the second water measurement station to reduce overlap in operation of the first and second water measurement stations.

24. The method of claim 21 further comprising relaying the water measurement data to at least a third water measurement station in the auto-network.

25. The method of claim 21 further comprising waking the water measurement stations on a predetermined schedule.

* * * * *